(12) United States Patent
Gregory et al.

(10) Patent No.: US 7,070,441 B1
(45) Date of Patent: Jul. 4, 2006

(54) ACID SEAL

(75) Inventors: Mark K. Gregory, Racine, WI (US); Bernard N. Spiegelberg, Germantown, WI (US); Terry J. Evraets, West Bend, WI (US)

(73) Assignee: Tulip Corporation, Milwaukee, WI (US)

( * ) Notice: Subject to any disclaimer, the term of this patent is extended or adjusted under 35 U.S.C. 154(b) by 0 days.

(21) Appl. No.: 10/801,101

(22) Filed: Mar. 15, 2004

(51) Int. Cl.
*H01R 4/26* (2006.01)

(52) U.S. Cl. ........................... 439/404; 429/182
(58) Field of Classification Search ............... 429/178, 429/179, 180, 181, 182, 184; 439/604, 606
See application file for complete search history.

(56) References Cited

U.S. PATENT DOCUMENTS

| | | | | |
|---|---|---|---|---|
| 1,939,105 A | * | 12/1933 | Allen | 439/754 |
| 4,299,891 A | * | 11/1981 | Mocas | 429/179 |
| 4,839,471 A | * | 6/1989 | Clark et al. | 174/92 |
| 4,859,547 A | * | 8/1989 | Adams et al. | 429/121 |
| 5,364,714 A | * | 11/1994 | Gurtler | 429/178 |
| 6,258,481 B1 | * | 7/2001 | Ross et al. | 429/180 |
| 6,644,084 B1 | | 11/2003 | Spiegelberg | |
| 6,803,146 B1 | * | 10/2004 | Key et al. | 429/182 |

* cited by examiner

*Primary Examiner*—Ross Gushi
(74) *Attorney, Agent, or Firm*—Foley & Lardner LLP (57) ABSTRACT

A battery terminal includes an undercut groove that provides a leak proof seal between a battery terminal and a plastic battery cover or housing. The leak proof seal prevents electrolyte from seeping from the interior of the housing as well as prevents electrolyte from seeping between the battery terminal and plastic housing when the battery housing is filled with electrolyte.

26 Claims, 5 Drawing Sheets

ACID SEAL

CROSS-REFERENCE TO RELATED PATENT APPLICATIONS

None

BACKGROUND OF THE INVENTION

The present invention relates generally to the field of battery terminals. More specifically, the invention relates to a battery terminal having an undercut feature about which a plastic container or cover flows upon molding to form a seal.

In general battery terminals are utilized as an interface between a sealed battery container and an external device seeking electrical power. In sealed batteries that contain liquid electrolyte the battery terminal must be configured to prevent leakage of electrolyte to ensure the battery will not fail prematurely when utilized. To prevent leakage of electrolyte it is common to provide a plurality of annular rings extending around the battery terminal which is then embedded in the wall of a container body or cover. However, even with rings about the battery terminal embedded within a plastic container it is still possible for electrolyte to leak through the container along a flash line that is caused during the cold forming or casting manufacturing process.

One attempt to minimize the leaking of electrolyte is to form an undercut on one or more of the rings as disclosed in U.S. Pat. No. 6,644,084 entitled Method and Apparatus for Manufacturing a Battery Terminal with Undercut Rings, issued to Bernard Spiegelberg and assigned to the owner of the instant application.

Once the terminal is embedded within the plastic housing, the entire container is dipped within an electrolyte bath to fill the interior volume of the housing. Some of the electrolyte seeps between the battery terminal and the plastic housing at the interface on the top of the housing. Specifically, electrolyte may seep between the interface between the plastic and the battery terminal. The electrolyte that seeped within the interface then seeps outward over time and changes the color of the external portion of the terminal. Although, this small volume of electrolyte is not leaking from within the sealed battery, it none the less darkens the battery terminal. The darkened battery terminal suggests that there maybe a leak between the battery terminal and plastic housing. As a result the battery terminal seal will be viewed as defective.

An additional problem with the manufacture of batteries is the need to use an adhesive to fully seal a lead battery terminal within a plastic cover or housing. One such attempt to eliminate the need for an adhesive is solved by the use of undercut rings as disclosed in U.S. Pat. No. 6,644,084. It would be desirable to eliminate the need to use adhesive as well as to eliminate the need to form rings.

It would be desirable to eliminate electrolyte from being trapped between the terminal and housing as the housing is being filled. It would further be desirable to provide a leak proof feature between the terminal and housing at both the interface between the lower portion of the terminal within the housing and the upper portion of the housing proximate the top surface of the housing. It would also be desirable to eliminate the need to form rings about the battery terminal and still provide a sufficient seal to provide a seal between the battery terminal and plastic housing or cover.

SUMMARY OF THE INVENTION

One embodiment of the invention relates to a battery terminal including a body having a top surface and an opposing bottom surface. A first groove extends within the body proximate the bottom surface of the body.

In another embodiment of the invention a battery includes a housing having an outer surface and an inner surface defining an interior and a terminal. The terminal is connected to the housing with an undercut groove formed in the terminal. The terminal includes a first portion extending above the housing, a engagement portion engaged with the housing and a third portion in fluid communication with the interior of the housing. The terminal includes a longitudinal axis extending through the terminal and substantially perpendicular to the portion of the housing through which the terminal is engaged. The undercut groove is located within the engagement portion. The undercut groove includes an opening having a first width, the undercut groove also includes a portion having a width that is greater than the first width of the opening.

In yet another embodiment, a battery terminal includes a body having a first portion, and an engagement portion. The body defines a longitudinal axis that extends through the body. The body includes a first undercut groove within the engagement portion. The undercut groove includes an opening that has a first width. The undercut groove also includes a portion that has a width that is greater than the width of the opening.

DETAILED DESCRIPTION OF THE PREFERRED EMBODIMENTS

Figure 1:
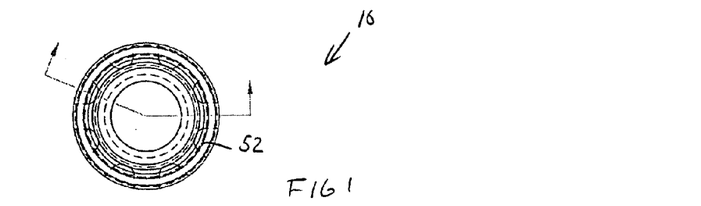
FIG. 1 is a top view of a battery terminal.

Referring to FIG. 1, a standard top terminal 10 includes an upwardly extending frustum 12, a center spline 14 and a head 16 extending from spline 14 opposite frustum 12. A longitudinal axis 18 extends through the center of frustum 12 and head 16.

Head 16 includes a bottom surface 20 and an external side surface 22. In a standard top terminal, head 16 includes a plurality of radial rings extending outward from side surface 22. Spline 14 includes an upper surface 24, an opposing lower surface 26 and an outwardly extending peripheral surface 28 extending between the upper and lower surfaces 24, 26.

Figure 2:
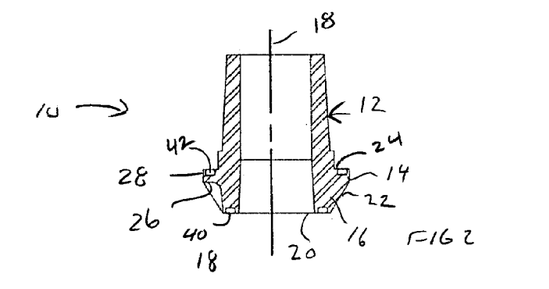
FIG. 2 is a cross-sectional view of the battery terminal of FIG. 1.
Figure 3:
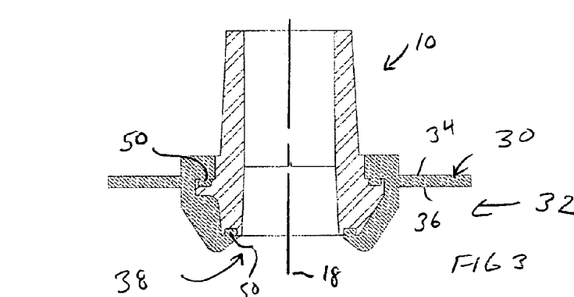
FIG. 3 is a cross-sectional view of a battery terminal encased in battery casing.

Top terminals 10 are typically molded within a plastic cover 30 of a battery container 32. Cover 30 includes an upper surface 34, and an opposing lower surface 36. Extending between the upper and lower surfaces of cover 30 is an aperture 38 that sealingly receives and engages spline 14. Referring to FIGS. 1–3, head 16 includes a first undercut groove 40 located within the bottom surface 20 of head 16. As discussed below, undercut groove 40 may be located along other portions of head 16. Similarly, a spline undercut groove 42 extends into an upper surface 24 of center spline 14.

Figure 10:
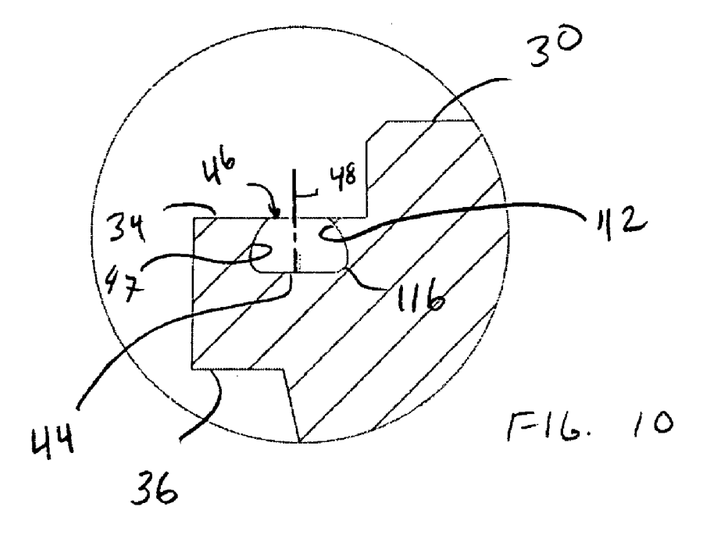
FIG. 10 is a partial cross-section of the undercut grooves of the battery terminals.

Referring to FIG. 10, undercut grooves 40 and 42 include a base region 44 that is wider than the opening 46 forming the undercut groove. A side wall 47 extends from base 44 to opening 46 to form the groove cavity. A groove vector 48 is defined by an axis extending between and perpendicular to base 44 and opening 46. In one embodiment, groove vector 48 of undercut grooves 40, 42 is parallel to longitudinal axis 18 of terminal 10.

Referring to FIG. 3, cover 30 is formed about battery terminal 10 to sealingly engage the terminal. Cover 30 includes a seal bead 50 that is located within grooves 40 and 42. The plastic cover is formed by molding the plastic about battery terminal 10. As a result seal beads 50 interlock the cover and battery terminal preventing movement of battery terminal 10 along its longitudinal axis 18. Indents 52 within terminal 10 prevent battery terminal from rotating about longitudinal axis 18 when battery terminal 10 is molded into cover 30. During the forming process of the cover about battery terminal 10, the plastic of cover 30 flows and fills the entire region of undercut grooves 40, 42. As a result the seal bead has a region proximate base 44 that is wider than the region proximate opening 46 of the undercut 40. This wider region of plastic of the seal bead locks the plastic cover to the battery terminal prohibiting movement of the battery terminal along longitudinal axis 18.

Figure 4:
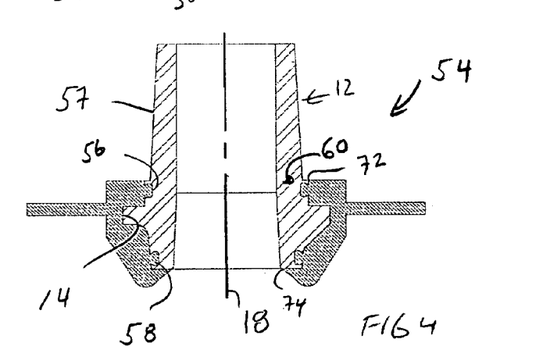
FIG. 4 is a cross-sectional view of an alternative embodiment of a battery terminal encased in a battery casing.
Figure 4A:
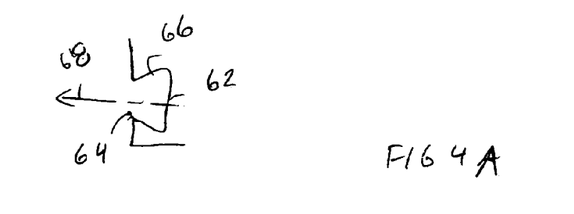
FIG. 4A is a partial cross section of an undercut groove.
Figure 5:
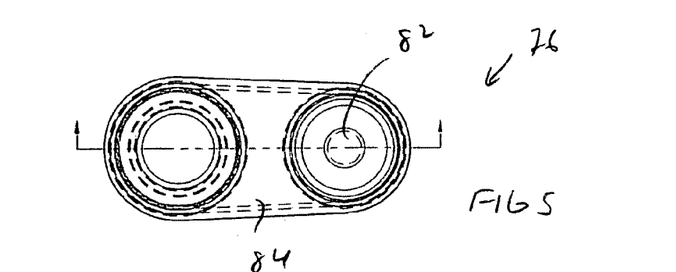
FIG. 5 is a top view of another battery terminal.
Figure 6:
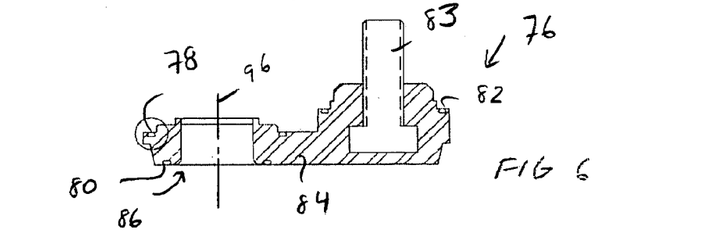
FIG. 6 is a cross-sectional view of the battery terminal of FIG. 5.

Referring to FIG. 4, an alternative embodiment battery terminal 54 is similar to battery terminal 10 in many respects. Features of battery terminals 10 and 54 that are similar, will be referred to with the same nomenclature. Battery terminal 54 includes a first upper groove 56 and a second lower groove 58. Upper groove 56 is located within an outer surface 57 of frustum 12 proximate spline 14 in shoulder region 60. Referring to FIG. 4A, both grooves 56, 58 include a base portion 62 and an opening 64 having a cross-sectional area, less than the area of base 62. Wall portion 66 extends from base 62 to 64. Wall portion 66 extends inward toward one another as it extends from base 62 toward opening 64. In this manner an undercut groove is formed. A groove vector 68 extends from base 62 toward opening 64 and is normal to base 62 and the cross sectional area of opening 64. Groove vector 68 is substantially perpendicular to longitudinal axis 18 of battery terminal 54. The direction of groove vector 68 is substantially ninety degrees relative to groove vector 48.

While groove vectors 48 and 68 are respectively substantially parallel and perpendicular to longitudinal axis 18, it is possible that undercut grooves may be formed with a groove vector that is at an angle to longitudinal axis 18 that is between zero and ninety degrees.

It is also possible that the battery terminal include one undercut groove that has a groove vector that is parallel to longitudinal axis 18 and a second undercut groove that is perpendicular to longitudinal axis 18. A battery terminal may include one undercut groove such as undercut groove 56 on the shoulder area of frustum 12 and a second undercut groove such as undercut groove 40 on the bottom surface 20 of head 16. Alternatively, a battery terminal may include one undercut groove within the upper surface 24 of spline 14 such as undercut groove 42 of battery terminal 10 and a second undercut groove within outer surface 57 of shoulder region 60 of frustum 12 such as undercut groove 56 of battery terminal 54.

The position of grooves 40, 42, 56 and 58 are close to the region where the plastic portion of the housing or cover ends and the battery terminal is exposed. The closer the groove is to the terminal edge of the plastic adjacent the batter terminal the less area any liquid may seep between the plastic cover or housing and the battery terminal. Referring to FIG. 4 the interface between the plastic cover or housing includes an upper terminal edge 72 and a lower terminal edge 74.

Battery terminal 10 and 54 may include one or more rings about head 16. Alternatively, head 16 may include an outer surface without a ring extending thereabout. Head 16 may also include other patterns about the outer surface of head 16 such as a knurled, ribbed or other pattern whether symmetrical or random.

Referring to FIGS. 5–9, another type of battery terminal 76 includes a first upper undercut groove 78, a second lower undercut groove 80 and a third upper undercut groove 82. Battery terminal 76 includes an insert or stud 83 extending from a base 84 and an offset head portion 86. An embodiment of this type of offset battery terminal is disclosed in U.S. patent application Ser. No. 10/162,059 entitled "Cold Formed Battery Terminal" and incorporated herein by reference. Head portion 86 may include a plurality of acid rings extending there from as disclosed in the '059 application. Undercut groove 80 may be used in conjunction with acid rings (not shown) or may be employed without acid rings. Undercut grooves 78, 80, 82 are located proximate to points 88, 90, 92 respectively where a plastic cover or housing 94 will be molded to the battery terminal. The location of undercut grooves proximate the terminal edges of the plastic cover provides both a seal between the battery terminal 76 and the interior of the housing to prohibit electrolyte from seeping out of the housing, but also minimizes the ability of electrolyte to seep between the battery terminal and cover or housing when the battery is filled by dipping the entire container in an electrolyte bath.

Undercut grooves 78, 80 and 82 have the same geometry as the undercut groove illustrated in FIG. 10. Undercut groove vector 48 is substantially parallel to a longitudinal axis 96.

Figure 7:
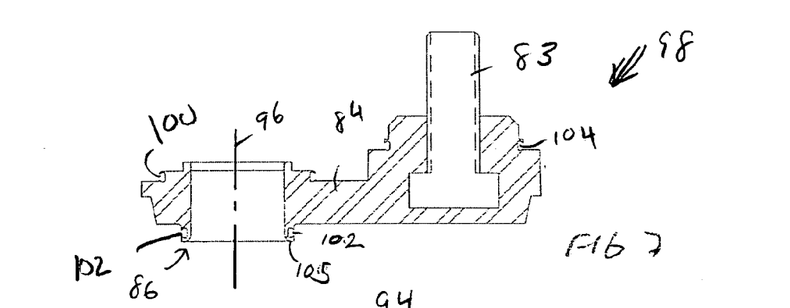
FIG. 7 is a cross sectional view of an alternative embodiment of the battery terminal of FIG. 5.
Figure 8:
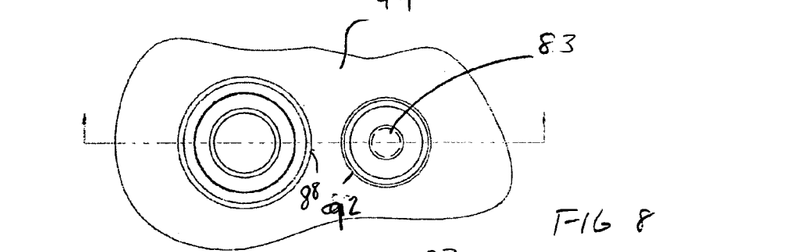
FIG. 8 is a top view of the battery terminal of FIGS. 5 and 6 encased in a battery casing.
Figure 9:
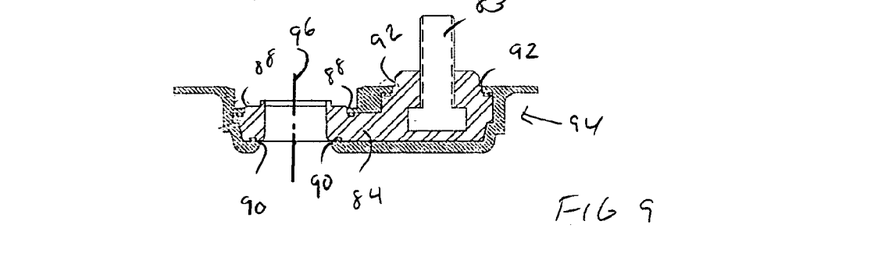
FIG. 9 is a cross-sectional view of the battery terminal of FIG. 8 encased in a battery casing.

Referring to FIG. 7, an alternative embodiment battery terminal 98 is similar to battery terminal 76 in many respects. Components of battery terminals 76 and 98 that are similar will be referred to with the same nomenclature. Battery terminal 98 includes a first upper undercut groove 100, a second lower undercut groove 102, and a third upper undercut groove 104. Undercut grooves 100, 102 and 104 are located proximate to the terminal edges 88, 90, 92 respectively where the plastic cover or housing 94 will be molded to the battery terminal. The geometry of undercut grooves 100, 102 and 104 is similar to the geometry of undercut grooves 56, 58 of battery terminal 54 and illustrated in FIG. 4A. The undercut groove vector is substantially perpendicular to longitudinal axis 96 of battery terminal 98. Head portion 86 of battery terminal 98 includes an extension portion 105 extending downward from base 84 to allow for undercut groove 102 to be formed.

Figure 11:
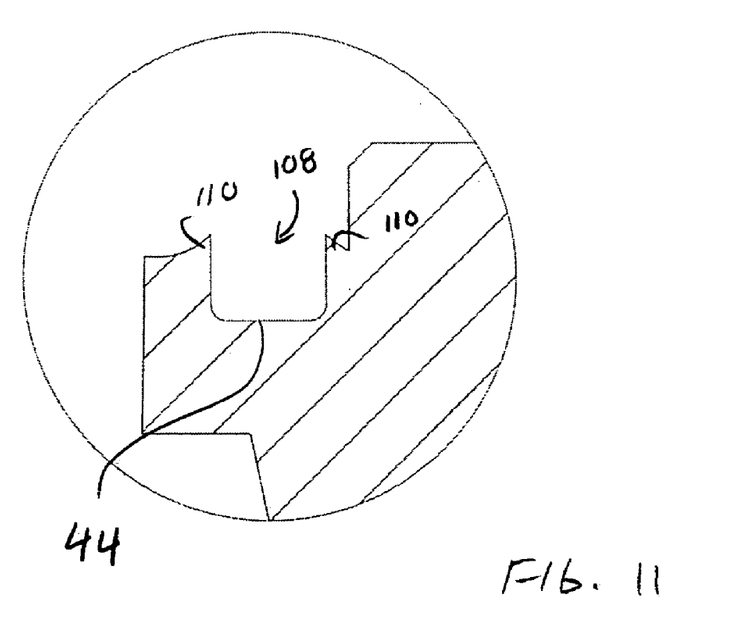
FIG. 11 is a partial cross-section of a groove in one step of the manufacturing process for forming the undercut groove of the battery terminals.

Referring to FIG. 11, a method for manufacturing the undercut grooves includes first forming a groove 99 having a base 44 and an opening 108 that has a diameter or cross sectional area that is equal to or greater than the diameter or cross sectional area of base 44. The battery terminal includes a raised portion 110 proximate the opening 108. In a second die operation, rolling or any other equivalent operation the raised portion 110 is lowered to form opening 46 as shown in FIG. 10.

Groove 99 extends 360 degrees about the terminal. Where groove 99 has a groove vector that is parallel to the longitudinal axis of the terminal, a die acts in a single plane to reform the groove and move the raised portion 110 to form the undercut feature. Further acting on a single plane eliminates the flash line along the groove. In contrast where groove 99 has a groove vector that is perpendicular to the longitudinal axis of the terminal, the die required to reshape portion 110 must have a circular form.

Opening 46 has a width or cross sectional area that is less than the width or cross sectional area of the base 44. As a result a wall 47 is formed and extends from base 44 to the outer periphery of opening 46. The upper portion 112 of wall 47 will have a concave shape. In one embodiment, the width of base 44 is 0.06 inches and the width of opening 46 is 0.04 inches. The distance between base 44 and opening 46 is 0.04 inches. However, other geometry may be employed as well and the invention is not limited to these specific measurements. In one embodiment the linear path between the edge of the undercut groove to the terminal edge of the plastic cover or housing is preferably between 0.0 and 0.5 inches. The shorter the distance between the terminal edge of the plastic and the edge of the opening of the undercut groove minimizes the region in which acid or electrolyte may seep. In one embodiment the undercut grooves are located at least 0.03 inches of the terminal edge of the plastic cover or housing to ensure the groove is completely filled with plastic given manufacturing tolerance. Of course, the distance may be greater than 0.5 inches or less than 0.03 inches and still retain certain benefits of the undercut groove geometry.

The undercut groove concept may be used on all types of battery terminals that are sealed within a plastic cover or housing. For instance, a side battery terminal as shown in U.S. Pat. No. 5,589,294. Similar to the battery terminals discussed herein, side battery terminal may include undercut grooves with a groove vector that is parallel to or perpendicular to a longitudinal axis of the battery head. Additionally, the acid rings that are included on the head of the L-shaped battery or the side terminal battery may be eliminated by the use of the undercut grooves.

Figure 12:
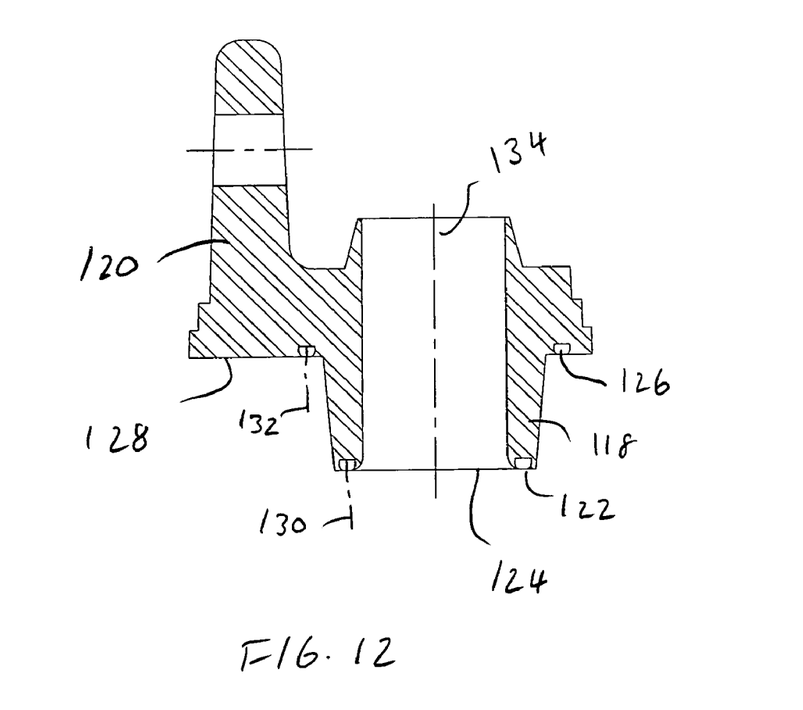
FIG. 12 is a cross-sectional view of another embodiment of a battery terminal.
Figure 13:
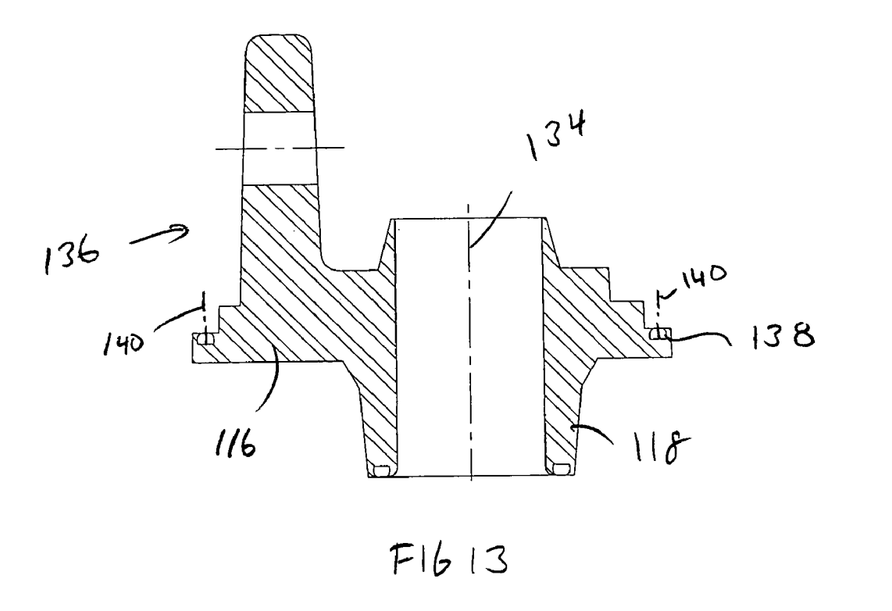
FIG. 13 is a cross-sectional view of another embodiment of the battery terminal of FIG. 12.

Referring to FIGS. 12 and 13, the use of the undercut grooves may also be used with an "L-shaped" battery terminal. L-shaped battery terminals are used and one embodiment of an L-shaped battery terminal is disclosed in U.S. Pat. No. 5,606,887. The L-shaped battery terminal may also be modified to employ undercut grooves at the interface between the plastic cover or housing and the battery terminal. Referring to FIG. 12 an L-shaped battery terminal 114 includes a base portion 116, a head portion 118 and an offset member or flag 120 extending upwardly from base portion 116. A first undercut groove 122 is located within a bottom surface 124 of base portion 116. A second undercut groove 126 is located within a bottom surface 128 of base 116 proximate head 118. Both first and second undercut grooves 122 and 126 have a groove vector 130, 132 extending downwardly and parallel to a longitudinal axis 134 of head 116.

Referring to FIG. 13, an L-shaped terminal 136 is similar in all respects to battery terminal 114 of FIG. 12 with the exception of the location of the undercut groove on the base proximate the head portion. Battery terminal 136 includes an undercut groove 138 located within an upper surface 140 of base 116. Undercut groove 138 includes a groove vector 140 extending upwardly and is parallel with longitudinal axis 134 of head 118.

Battery terminals are typically formed from lead or a lead alloy. However, the battery terminals described herein may be formed from other materials as well. Further the use of the undercut grooves proximate the interface of the cover or housing and battery terminal may be applicable to any lead component that is being sealingly engaged with a plastic component. Further the use of the undercut grooves may apply to any component that is being sealingly engaged with a plastic component.

Although not disclosed the L-shaped terminal could include undercut grooves having a groove vector that is perpendicular to longitudinal axis 134. Undercut grooves having a groove vector perpendicular to longitudinal axis 134 could be located within an outer surface of head 118 proximate bottom surface 124 of head 118 and within an outer peripheral surface of base 116. As noted above, it is possible to use one undercut groove having a groove vector substantially parallel to the longitudinal axis of the battery head, and a second undercut groove having a groove vector substantially perpendicular to the longitudinal axis. It is possible to have two or more undercut grooves having groove vectors that differ from one another.

The undercut groove concept provides a number of advantages. Where the undercut groove has a groove vector that is parallel to the longitudinal axis of the battery terminal or head, the undercut groove may be formed without the need to roll the terminal about its axis. This is in contrast to the method in which the arrow head rings are formed on a battery terminal as disclosed in U.S. Pat. No. 6,644,084 as discussed above. The method described in the '084 patent requires that a head or forming member rotate relative to the terminal. Alternatively, the rings may be formed by employing a second die operation, that upsets the material 110 about the groove. Similarly, if the rings disclosed in '084 were upset in a second die operation, an arrow-head ring shape could also be formed by a secondary die operation where the dies move along a horizontal axis or perpendicular to the longitudinal axis of the terminal.

Figure 14:
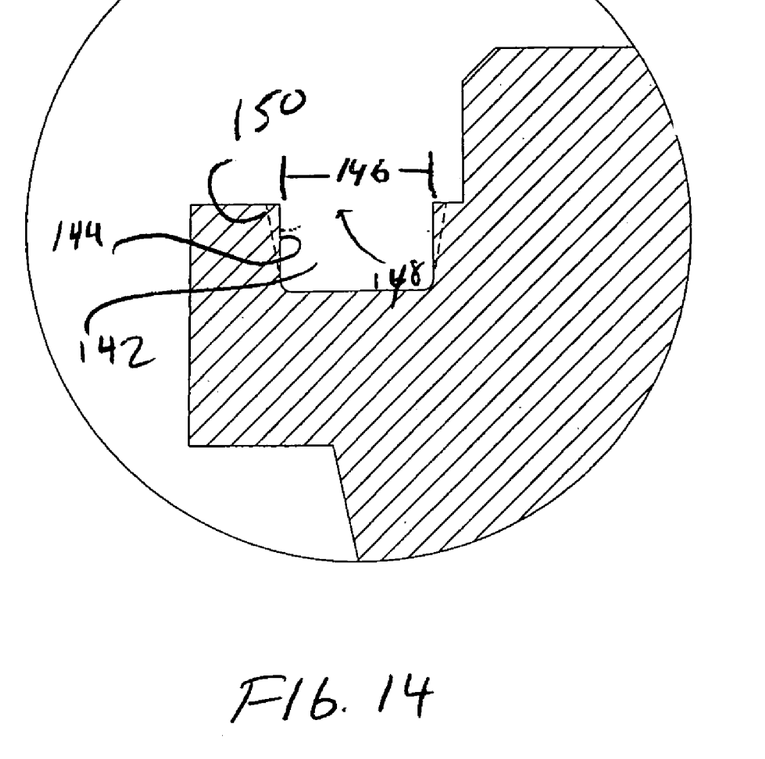
FIG. 14 is a cross-sectional view of an alternative groove for use with a battery terminal.

Plastic creeps away from the terminal over time. It is believed that the main direction of creep is in a direction away from the longitudinal axis of the terminal. The creep in the direction parallel to the longitudinal axis is not as significant. Accordingly, where the grooves have a groove vector parallel to the longitudinal axis, the undercut feature, where the opening of the groove is less than a width of the groove itself may not be required. It is envisioned that grooves formed with a groove vector parallel to the longitudinal axis may not need the undercut feature. As a result the width of the opening need not be less than the width of the base of the groove or less than a width as measured between the side walls. Further, it is possible that the width of the opening may be greater than the width of the groove base or width between the walls. In this manner it is possible to have a positive draft angle of the walls of the groove to aid manufacturing. Creep is a result of hoop stress that occurs when a plastic component is molded about an insert. The plastic battery cover or housing tends to creep away from the battery terminal as a result of hoop stress. As noted above, it is believed that creep in the direction away from the battery terminal is greater in a direction perpendicular to the longitudinal axis of the terminal than in the direction parallel to the longitudinal axis of the terminal. This phenomenon allows the grooves with a groove vector parallel to the longitudinal axis of the terminal to be formed without an undercut and still provide an improved seal over the traditional battery acid rings. Referring to FIG. 14 an example of a groove 142 includes side walls 144 that define a width 146 proximate opening 148 that is equal to or greater than the maximum width of the groove 142. Referring to the dashed lines in FIG. 14, side walls 150 may have an outward draft as well.

While the detailed drawings, specific examples, particular structures describe preferred and exemplary embodiments, they serve the purpose of illustration only. The disclosure is not limited to the specific forms and geometry shown. For example, the structural configurations shown and described may differ depending on the specific type of battery terminal and type of cover or battery housing. While the battery terminal is typically formed from lead or a lead alloy, the battery may be formed from any type of material. Similarly, while a battery cover and housing is typically formed from a plastic material, other types of cover and or housing material is contemplated that will fit within the grooves disclosed. Additionally, the battery terminals may be formed from a number of different methods including cold or hot forging, die-casting, centrifugal casing, gravity casing, machining or any other manufacturing method. Further it is contemplated that a "T" shaped post may extend from the battery terminal forming a groove or channel between the upper arm of the T and the battery terminal body itself. Such a design is contemplated. Further where the upper arm of the T is closer to the battery terminal the further the upper arm is from the upright arm of the T, an undercut groove is formed between the T and the body of the battery terminal. Accordingly, the structures depicted and described are not limited to the precise details, measurements, modifications and conditions disclosed. Furthermore, other substitutions, modifications, changes and omissions may be made in the design, operating conditions, and arrangement of the exemplary embodiments without departing from the scope of the disclosure.

What is claimed is:

1. A battery terminal comprising:
a body having a top surface, an opposing bottom surface, and a first groove extending within the body proximate the bottom surface wherein the first groove extends 360 degrees about the body and includes a base portion having a first width and an opening having a second width less than the first width.

2. The battery terminal of claim 1, wherein the body includes a longitudinal axis extending substantially perpendicular between the top and bottom surfaces, the first groove defining a first groove vector extending substantially perpendicular between the base and the opening, the first groove vector being substantially perpendicular to the longitudinal axis.

3. The battery terminal of claim 2 wherein the distance between the base of the first groove and the bottom surface is less than the distance between the opening of the first groove and the bottom surface.

4. The battery terminal of claim 2, wherein the distance between the base of the first groove and the bottom surface is greater than the distance between the opening of the first groove and the bottom surface.

5. The battery terminal of claim 1, further including a second groove located closer to the top surface than the first groove.

6. The battery terminal of claim 5, wherein the body includes a base portion with an insert embedded therein and bottom portion extending downward from the base portion, wherein the first and second grooves are located within the bottom portion and base portion respectively.

7. The battery terminal of claim 5, wherein the body includes a frustum extending downward from the top surface, a bottom portion adjacent the bottom surface and a spline located between the frustum and the bottom portion, wherein the first groove is located in the bottom portion and the second groove is located proximate the spline.

8. The battery terminal of claim 7, wherein the second groove is located within the spline.

9. A battery comprising:
a housing having an outer surface and an inner surface defining an interior; and
a terminal connected to the housing, having a first portion extending above the housing, a engagement portion engaged with the housing and a third portion in fluid communication with the interior of the housing, the terminal including a longitudinal axis extending through the terminal and substantially perpendicular to the portion of the housing through which the terminal is engaged, the terminal including a first groove within the engagement portion, the first groove including an opening having a first width, the first groove also including a portion having a width that is greater than the first width of the opening wherein the first groove includes a first groove vector extending from the base of the groove toward the opening of the groove, wherein the first groove vector is parallel to the longitudinal axis.

10. The battery of claim 9, wherein the terminal includes a second groove including a second opening having a second opening width, the second groove includes a second portion having a second portion width that is greater than the second opening width.

11. The battery of claim 10, wherein the second groove includes a second groove vector extending from the base of the second groove toward the opening of the second groove, wherein the second groove vector is parallel to the longitudinal axis.

12. The battery of claim 10, wherein the second groove includes a second groove vector extending from the base of the second groove toward the opening of the second groove, wherein the second groove vector is perpendicular to the longitudinal axis.

13. The battery of claim 10 wherein the housing includes an edge proximate each groove.

14. The battery of claim 10, wherein the second groove includes a second groove vector extending from the base of the second groove toward the opening of the second groove, wherein the second groove vector is parallel to the longitudinal axis.

15. The battery of claim 10, wherein the second groove includes a second groove vector extending from the base of the second groove toward the opening of the second groove, wherein the second groove vector is perpendicular to the longitudinal axis.

16. A battery terminal comprising:
a body having a first portion extending from an engagement portion, the body including a longitudinal axis extending through the body, the body including a first groove within the engagement portion, the first groove extending substantially 360 degrees about a portion of the body and including an upwardly extending opening having a first width, the first groove also including a portion having a width that is greater than the first width of the opening.

17. The battery terminal of claim 16, wherein a vector extending between the base of the first groove and the opening of the first groove is parallel to the longitudinal axis of the body.

18. The battery terminal of claim 16, further including a second groove including a second opening having a second opening width, the second groove includes a second portion having a second portion width that is greater than the second opening width.

19. The battery terminal of claim 18, wherein a vector extending between the base of the first grooves and the opening of the first groove is parallel to the longitudinal axis and wherein a second vector extending between the base of the second groove of the body is perpendicular to the longitudinal axis.

20. A battery comprising:
a terminal including a groove extending 360 degrees therearound, the groove including a base and an opening;
a plastic housing having an outer surface and an inner surface defining an interior, the terminal being molded within the plastic housing and having a portion extending outwardly from one outer surface of the plastic housing, the plastic housing having a sealing bead extending into the opening of the groove and filling the area within the groove, the groove defining a groove vector extending substantially perpendicular through the area defined by the groove opening, the groove vector being substantially perpendicular to the one outer surface of the plastic housing, wherein the opening of the groove has a first width, the groove also including a portion having a width that is greater than the first width.

21. The battery of claim 20, wherein the groove is proximate the outer surface of the container.

22. The battery of claim 21, wherein the terminal includes a second groove proximate the inner surface of the container.

23. The battery of claim 20, wherein, the plastic container includes an edge proximate the groove.

24. The battery of claim 23, wherein, the edge of the plastic container is within 0.5 inches of the groove.

25. The battery of claim 23, wherein, the edge of the plastic container is within 0.25 inches of the groove.

26. The battery of claim 23, wherein the edge is less than 0.25 inches from the groove.

* * * * *